Nov 1, 1949.    B. J. LAZAN    2,486,567
FATIGUE TESTING MACHINE
Filed Dec. 23, 1944    3 Sheets-Sheet 1
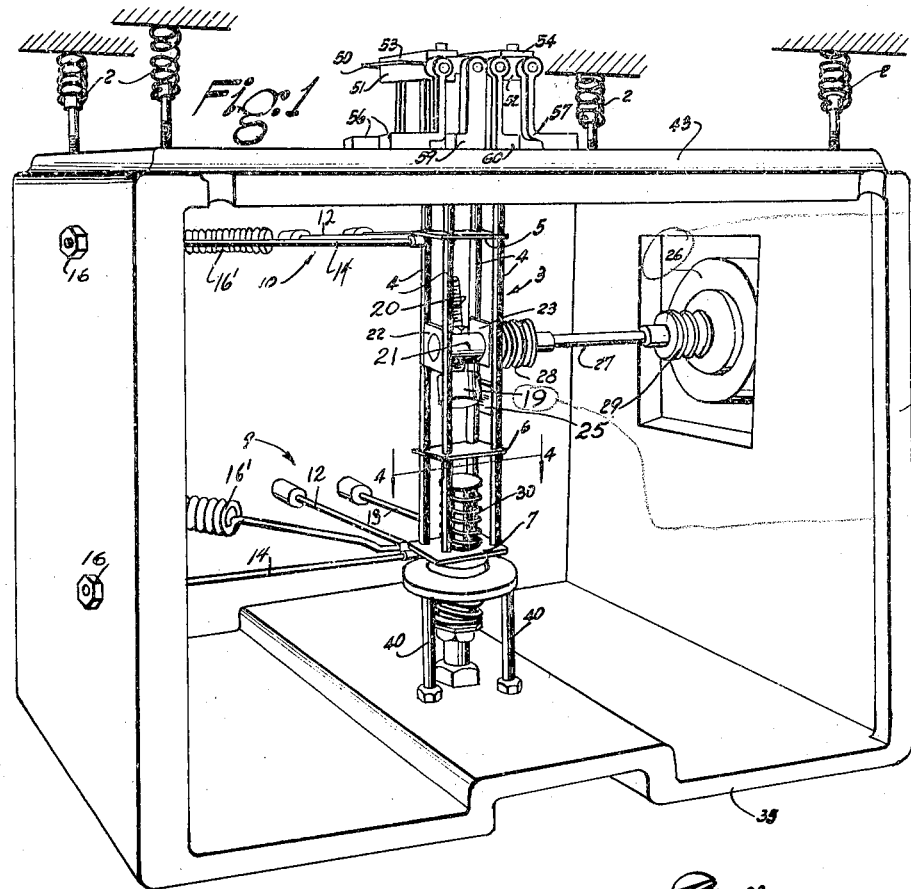
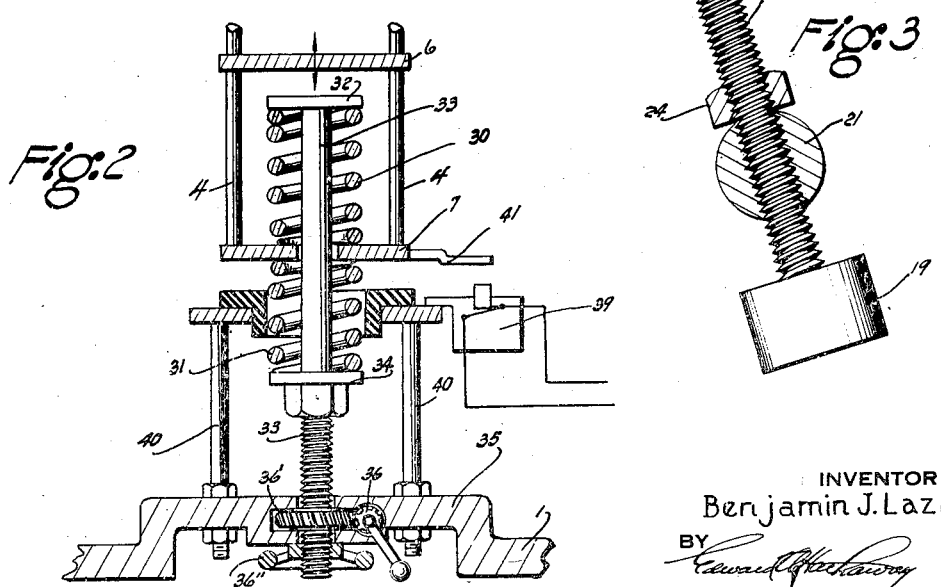
INVENTOR
Benjamin J. Lazan
BY
ATTORNEY Nov 1, 1949.  B. J. LAZAN  2,486,567
FATIGUE TESTING MACHINE
Filed Dec. 23, 1944  3 Sheets-Sheet 2

INVENTOR
Benjamin J. Lazan
BY
ATTORNEY

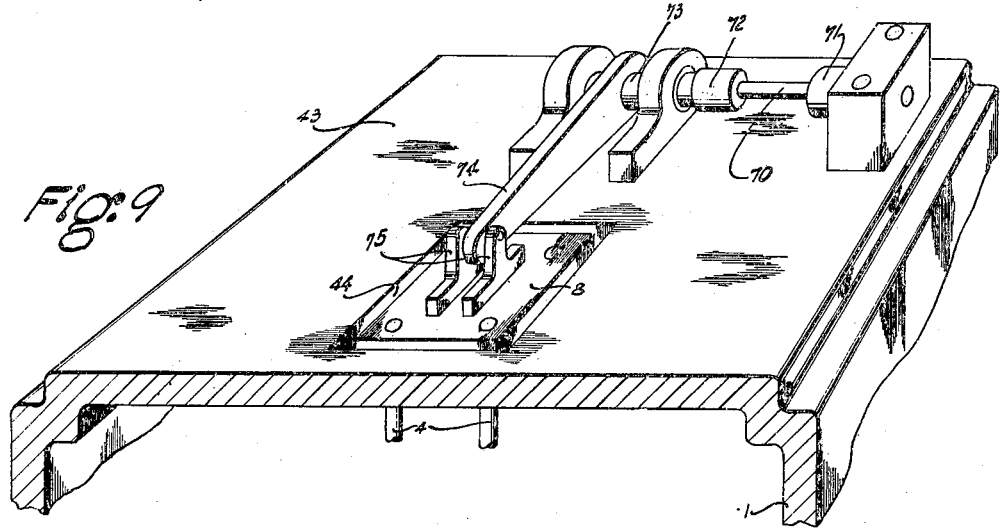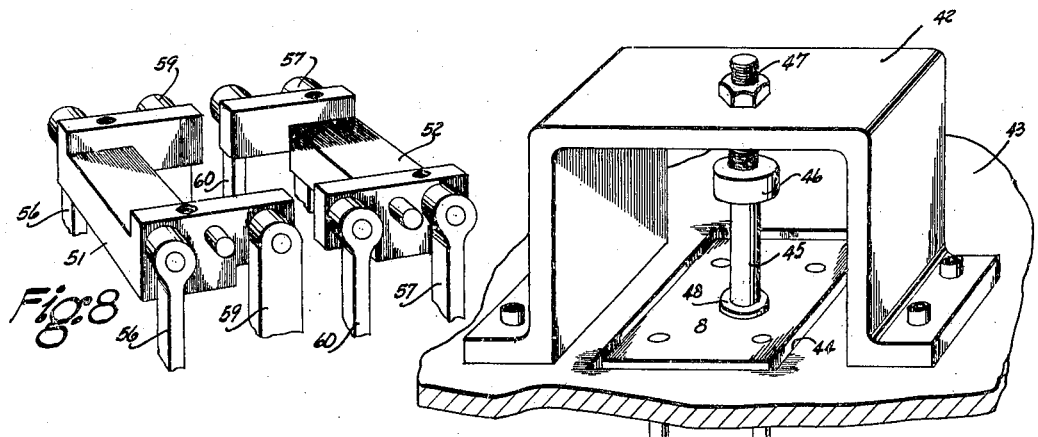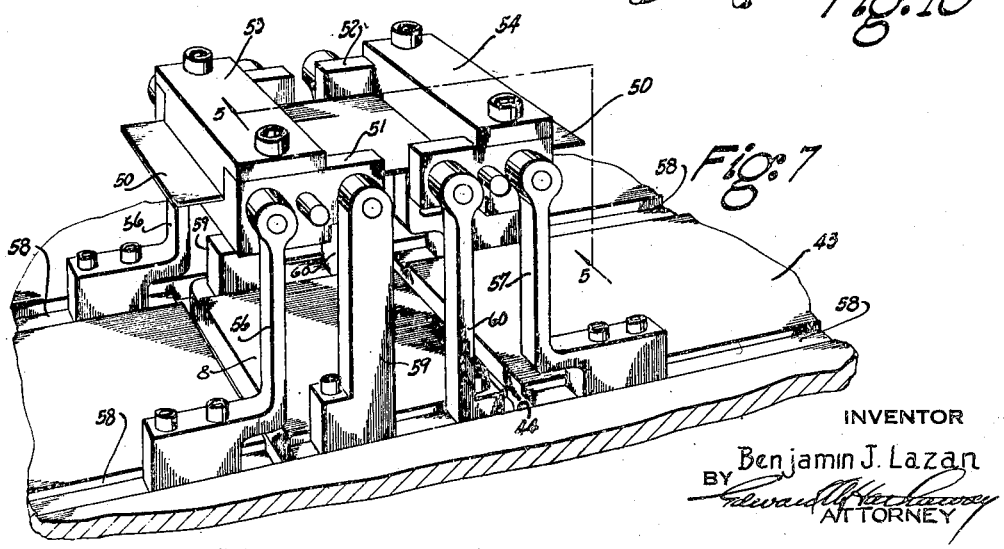

Patented Nov. 1, 1949

2,486,567

UNITED STATES PATENT OFFICE 2,486,567

FATIGUE TESTING MACHINE

Benjamin J. Lazan, Greenwich, Conn., assignor, by mesne assignments, to The Baldwin Locomotive Works, a corporation of Pennsylvania Application December 23, 1944, Serial No. 569,519

17 Claims. (Cl. 73—67)

This invention relates generally to fatigue testing apparatus for testing specimens and structures under an alternating force and more particularly to a reciprocating or vibratory force type fatigue machine operated below resonance.

Many attempts have heretofore been made to provide apparatus for fatigue testing in which an alternating force is applied to the specimen, but these prior art devices have been deficient in certain structural or functional aspects. For instance, in one type of machine a rotating crank produced a fixed stroke or amplitude of movement for alternately stressing a specimen but this had the disadvantage that the applied force changes as the elastic properties of the specimen changes. In another type an alternating force was produced by an electro-magnet and an inertia force compensator mechanism was employed therewith but this arrangement had the disadvantage of limited amplitude which restricted the machine to tension or compression testing and also involved uncertainties as to the force actually applied to the specimen or at least involved considerable difficulties and complications in determining the applied force as well as uncertainties as to whether the force was maintained constant. Furthermore, this type of machine did not inherently measure and control the magnitude of force automatically and as a result control accessories and devices were necessary. There was also the problem that inertia force compensators function at one speed only and as the speed control of such magnetic type machines was not absolute and accurate, the inertia compensation could not be absolute. In another type of machine an attempt was made to obtain large amplitude of specimen movement and at the same time obtain automatic correction for change of repeated load due to change in the elastic properties of the specimen during the course of a test or due to other possible changes in the system, but this required an adjustable crank throw for producing the variable amplitude together with the necessity of incorporating a load dynamometer in the machine and an automatic mechanism for adjusting the applied load force during the test. This added not only mechanical complications to the machine but injected variable conditions as well. Such uncertainties, or the cumulative effects of the uncertainties, involved in all of these various types of machines have caused considerable limitations of usefulness thereof.

It is an object of my invention to provide an improved variable amplitude constant alternating force fatigue testing machine which inherently produces, measures and controls with precision the magnitude of the alternating force so that it remains constant throughout wide variations in amplitude of movement without requiring any additional control accessories or devices and accurately applies such known alternating force to the specimen under test.

Another object of my invention is to provide an improved variable amplitude fatigue testing machine in which a constant alternating force may be calculated with mathematical precision and set with great accuracy before the machine is started and faithfully applied to the specimen and maintained throughout a large and variable amplitude of movement of the specimen.

A more specific object is to produce a variable amplitude and constant alternating force in an inertia compensated machine that is relatively simple in construction, operation and maintenance and is compact, sensitive and precise in operation together with having a high degree of ruggedness for a precision machine of this type.

A further object is to provide an improved variable amplitude constant alternating force fatigue testing machine which has considerable versatility in making many types of tests. In the specific embodiment of my invention tests can be made in tension, compression, torsion and bending, all of these being performed with equal facility and precision.

A further object is to provide an improved fatigue testing machine whereby an alternating force of the above mentioned precision qualities may be superimposed on a desired average preload.

In accomplishing the foregoing as well as other objects of my invention, I have provided a centrifugal type force generator mounted entirely on a suspended vibrating frame so as to move therewith, the combined mass of the frame and centrifugal mechanism being inertia compensated by a spring type inertia compensator whose spring constant is fixed throughout the life of the machine and the frame being laterally guided in such a manner that it has substantially frictionless movement and the centrifugal action has only an effective vertical component, the term "vertical" being used herein only in a relative and illustrative sense inasmuch as the principles of operation are equally applicable to a horizontally acting machine. With my improved combination I can first of all produce and apply directly to the specimen an alternating force whose magnitude is known merely by mathematical calculation without the need of a dynamometer and which is maintained accurately even though a large and variable amplitude of movement may occur. While the revolving weight of the centrifugal force generator travels in an orbital path when the frame vibrates and the major axis of the orbit varies in extent with variations in amplitude of the frame, yet it is possible to effectively compensate for the inertia effects of the revolving weight during its variable orbital movement as well as compensate for the inertia effects of the vertically moving frame. A further advantage of this general arrangement is that the magnitude of force may be selected over a wide range with ease, dispatch and accuracy merely by changing the radius of the centrifugal weight but without reducing the effectiveness of the compensator or requiring any adjustments thereof. The force thus produced for any selected radius can be determined with mathematical precision and the force generator calibrated accordingly at the time of initial manufacture.

Other objects and advantages will be more apparent to those skilled in the art from the following description of the accompanying drawings in which:

Fig. 1 is a perspective of my improved fatigue machine but with its seismic mount shown as connected to a diagrammatic ground support;

Fig. 2 is an enlarged sectional view through the inertia compensator spring arrangement;

Fig. 3 is an enlarged sectional view of the centrifugal weight showing the method of adjusting the radius thereof;

Fig. 7 is a perspective of the fixture shown in Fig. 5;

Fig. 8 is a fragmentary perspective of Fig. 7 with the specimen and base clamps removed;

Fig. 9 is a perspective of a fixture for making torsional tests with my machine; and Fig. 10 is a perspective of the fixture for making either tension or compression tests with my machine.

Figure 5:
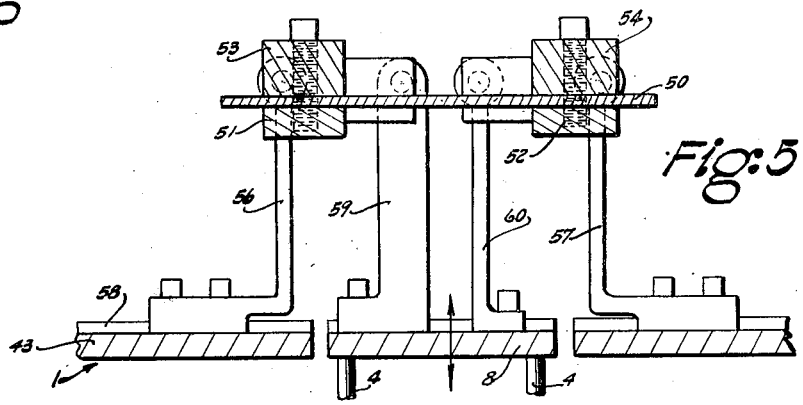
Fig. 5 is a vertical section of a bending beam type of fixture adapted to be employed with my machine and taken substantially in the plane 5—5 of Fig. 7.

I have shown in Fig. 1 a relatively heavy so-called seismic frame 1 that is suitably spring suspended from any ground supported frame or structure diagrammatically indicated at 2 thereby to prevent transmission of vibrations to the ground and to aid in quiet operation. A vertical vibratory frame generally indicated at 3 and which might be termed the specimen-engaging frame consists of four relatively slender rods 4 rigidly connected together by three plates 5, 6 and 7 while the uppermost ends of these rods are provided as shown in Figs. 5, 9 and 10 with a small table type plate 8 rigidly secured to the rods. The various plates and rods may be welded together if desired.

Figure 4:
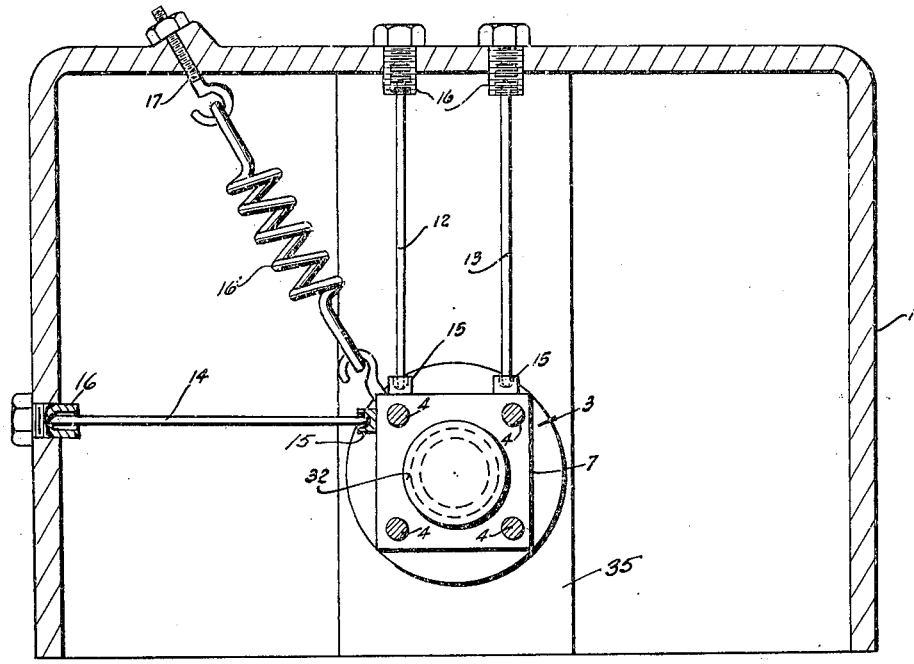
Fig. 4 is a horizontal section taken substantially in the plane 4—4 of Fig. 1.

This vibratory frame structure is supported for free vertical substantially frictionless movement by upper and lower sets of spring held guide rods generally indicated at 9 and 10. Each set, as shown in Fig. 4, includes a pair of parallel rods 12 and 13 extending from the seismic frame 1 to one side of the vibratory frame and a single rod 14 extending to the adjacent right angled side of the frame. These rods are preferably pointed at their ends and seated in suitable enlarged conical recesses formed in bosses 15 on the frame 3 and in removable threaded plugs 16 in the seismic frame. The connection of the rods with the frame 3 is preferably at the upper and lower plates 5 and 7. Each set of rods is held in position by a diagonally extending spring 16' suitably secured to the frame 3 and adjustably connected by a hooked bolt 17 to the seismic frame. This spring is positioned entirely to one side of a diametric line across the reciprocating or vibratory axis of the frame 3, more specifically between the single rod 14 and rod 12 at an angle so that the frame is firmly held against the points of all three rods of the upper and lower sets thereof. The parallel rods 12 and 13 prevent rotation of the vibratory frame and laterally stabilizes the same in one direction while the rod 14 laterally stabilizes the frame in a right angled direction. The guide rods are of sufficient length that their movable ends travel in such a flat vertical arc that for all practical purposes the frame is guided with no lateral movement through its range of vibratory amplitude. In this manner, I am able to provide an extremely light weight substantially frictionless guided vibratory frame of sturdy construction and to readily support a centrifugal force generator to be now described.

As shown in Fig. 3, the force generator comprises a weighted head 19 on a screw 20 adjustably threaded through a rotatable shaft 21 which is journaled in suitable bearing plates 22 and 23 secured to the respective pairs of columns 4 as by welding or other suitable means. The bearings for shaft 21 may be of any suitable ball or plain bearing type. To hold the centrifugal weight 19 in any radially adjusted position a lock nut 24 may be employed. The extent of radial adjustment and therefore the amount of centrifugal force produced may be determined by a suitable calibration plate 25, Fig. 1, secured to any one of the rods 4 whereby the preferably circular edge of weight 19 will be in proximity to the plate in some particular angular position of the weight. This scale would be calibrated by the manufacturer and could be determined with great mathematical precision by reason of the fact that the centrifugal force produced by weight 19 follows well-known mathematical laws. To rotatably drive shaft 21 at a predetermined constant speed a preferably synchronous electric motor 26 is mounted upon seismic frame 1 and is connected by a shaft 27 and a pair of universal joints 28 and 29 of any suitable construction to the weight shaft 21.

To compensate for the inertia effects of the masses of the reciprocating vibratory frame member 3 and of the force generator 19, 20 and 21 which combined constitute a single unit, the lower plate 7, Figs. 1 and 2, is disposed between the adjacent ends of two preferably coil springs 30 and 31 and the outer ends of these springs are respectively held by a collar 32 formed on the end of a rod 33 and by an adjustable collar 34. The springs are thus disposed coaxially of the vibratory frame, i. e. of the vibratory axis of the frame. The rod is suitably held by the bottom portion 35 of the seismic frame 1. In order to preload a specimen, rod 33 may be moved upwardly to compress spring 31 or downwardly to compress spring 30 thereby preloading the vibratory frame 3 either in an upward or downward direction as may be desired for any particular test, or the rod 33 may be adjusted so that no preloading action occurs whatsoever. To effect the foregoing adjustment if such is desired a worm 36, Fig.

2, operates a worm wheel 36' which may have threaded engagement with rod 33 and which is journalled in frame bottom 35 so that upon rotation of worm wheel 36' the screw is moved axially. A lock nut 36'' may hold the screw in any adjusted position. If desired, as shown in Fig. 2, a limit switch 39 may be mounted upon a frame 40 secured to the bottom 35 of the seismic frame. A switch contact arm 41 secured to the vibratory frame 3 is adapted to engage switch 39 when any desired maximum amplitude is reached thereby to shut off the current automatically for motor 26 and bring the machine to rest.

The springs 30 and 31 are effective to compensate for inertia effects regardless of the initial load conditions on the specimen. For instance, the extreme case would be no preloading of the specimen by the springs but nevertheless, the two way action of the springs causes them to be alternately effective for inertia compensation throughout the upper and lower portions of the complete vibratory cycle which is a sine wave.

The inertia compensator and the centrifugal type force generator are not only arranged in a simple, compact and effective manner, but the combination thereof is such that the compensating springs 30 and 31 have a fixed value determined at the time of manufacture. If various types of testing fixtures are used having different masses, the user is provided with small supplementary weights to be added to the vibrating frame 3, thereby to insure that the total mass of the entire vibrating elements remains constant at all times and accordingly the compensator spring and its spring constant need not be changed or adjusted.

To be certain that the machine will transmit to a specimen the mathematically calculated centrifugal force, it is only necessary to know that without a specimen in the machine the vibrating frame operates in resonance when the centrifugal weight is driven at its designed constant speed. This resonant point is present if the frame has its largest possible amplitude. To determine this, weights of various sizes are progressively added or removed from the vibratory frame and the increasing or decreasing effect on the amplitude is noted. It is thus possible to readily determine by observation of the amplitude the right amount of weight to be initially built into the machine at the time of manufacture. The maximum amplitude is easily perceived in my machine because of its inherent ability to have a large amplitude. The slightest variation from the proper mass will cause a noticeable drop in amplitude because the spring constant remains fixed. While the manufacturing of the machine depends upon a resonant condition, yet in testing a specimen the machine operates below resonance and inasmuch as all inertia effects of the vibrating parts are now fully compensated, the force produced by the centrifugal weight will therefore be precisely the force transmitted to the specimen.

The manner in which vertical vibratory movement of frame 3 is transmitted to a specimen depends largely upon the character of test to be performed. In the case of a single tension or compression test a U-shaped fixture 42 is removably secured to the top surface 43 of the seismic frame and overlies the specimen-engaging table top 8 of the vibratory frame. A suitable opening 44 is formed in the top 43 to receive the table 8. A specimen 45 may be placed between table 8 and an adjustable specimen platen 46 adjustably supported by a screw 47 in the fixture 42. The member 46 and a corresponding member 48 may be in the nature of grips for holding the specimen which may be subjected to either tension or compression testing.

Figure 6:
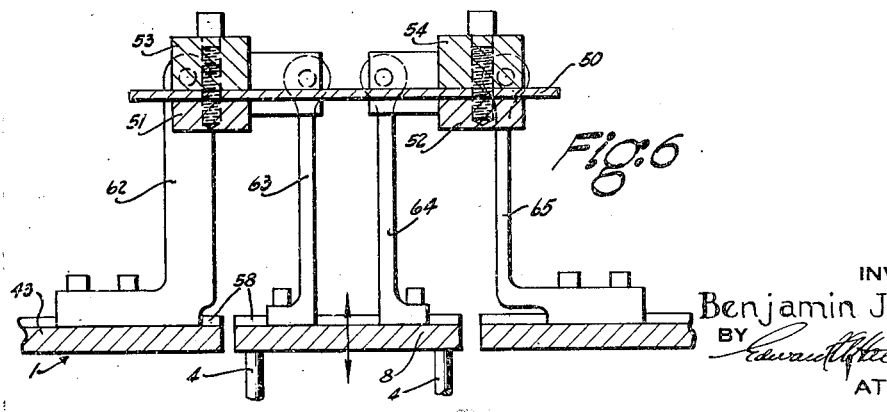
Fig. 6 is a view similar to Fig. 5 but showing a modified arrangement of legs.

For a flexure test of relatively thin sheet material 50, Fig. 7, a fixture is provided consisting of two identical grip bases 51 and 52 arranged opposite to each other and each being provided with clamping bars 53 and 54. The specimen 50 is clamped as shown in Fig. 7 and in order to bend or flex the specimen the outer ends of the grip bases are each pivotally supported upon a pair of vertically stationary supporting arms 56 and 57 which are relatively thin to allow flexing thereof in a direction lengthwise of specimen 50, these supporting arms, as shown in Fig. 7, being removably secured preferably in grooves 58 of top 43 of the seismic frame. The inner end of grip base 51 is secured to vibratory table 8 by a pair of rigid arms 59 located at each end of base 51. The base 52 is also connected to table top 8 by a pair of arms 60 which, however, are flexible in the same direction as arms 56 and 57. All of these arms have suitable pivotal connections with the bases so that as table top 8 moves upwardly and downwardly the grips will oscillate about the upper pivotal ends of stationary supports 56 and 57 although these supports will flex toward and away from each other as the specimen 50 bends downwardly and upwardly at its middle portion tending to shorten or lengthen the straight line distance between the upper pivotal points of supports 56 and 57. By having the single support 59 of rigid construction and located near the transverse centerline of the specimen, it is seen that the specimen 50 will be more uniformly loaded than if one or the other of supports 56 or 57 were rigid and the two inner supports 59 and 60 flexible. This latter possibility is shown in Fig. 6 wherein supports 62 and 63 corresponding to the positions of supports 56 and 59, Fig. 7, are interchanged. In this case, the specimen does not flex uniformly throughout its whole length during vertical movement of arms 63 and 64 for the reason that arm 64 and also arm 65 corresponding respectively to arms 60 and 57, Fig. 7, must make up for the entire longitudinal movement of the right end of specimen 50 as it is moved downwardly or upwardly.

Further evidence of the testing versatility of my machine is shown by the torsion testing combination of Fig. 9 in which a torsion specimen 70 has one end held in a suitable stationary gripping chuck 71 and its other end held in an oscillating chuck 72. This latter chuck is secured to a shaft 73 suitably journalled and supported on the top 43 of the seismic frame 1 while a long arm 74 is pivotally secured to the vibratory platen 8 through a pair of brackets 75 pivotally connected to arm 74 and removably secured to the platen 8. Vertical movement of table 8 causes arm 74 to oscillate shaft 73 and accordingly subject specimen 70 to torsional vibration.

The constant alternating force referred to herein means a repeated force of constant maximum magnitude. The intensity of the force does of course increase and decrease as it builds up to and recedes from the maximum during rotation of the centrifugal weight.

From the foregoing disclosure, it is seen that I have provided an extremely simple and yet very effective fatigue testing machine in which a known alternating force of precision magnitude may be repeatedly applied to a specimen with a high degree of stability and certainty throughout an extended testing period. The precision alternating force generator mounted in the freely vibrating frame as a vibratory unit therewith in combination with the relatively simple coil spring inertia force compensator with its fixed spring constant insures the highest degree of stable and accurate operation combined with simplicity and economy in structure, operation and maintenance and at the same time provides a machine of fine scientific qualities and versatile application. It is also apparent that while my machine normally operates below resonance, yet certain fundamental features thereof may be useful in resonant type machines. For instance, the centrifugal weight is carried by a freely suspended frame the whole of which is inertia compensated.

It will of course be understood that various changes in details of construction and arrangement of parts may be made by those skilled in the art without departing from the spirit of the invention as set forth in the appended claims.

I claim:

1. A variable amplitude constant alternating force fatigue testing machine comprising, in combination, a reciprocating vibratory member, a centrifugal force generator supported by said vibratory member to form a combined unit therewith and driven at a constant speed at all times for producing a constant alternating force, means for connecting said vibratory member to one point of a specimen by a mechanical connection such that the vibratory member follows movement of the specimen solely in accordance with yielding of the latter, substantially stationary means secured to the specimen at another point thereof so that the specimen can be subjected to the actual force produced by the centrifugal generator through said mechanical connection, and elastic means having a stiffness in relation to the vibratory mass so as to compensate for the inertia effects of said combined unit during a complete cycle of vibration, said elastic inertia compensating means being connected to and disposed intermediate of said vibratory member and said stationary means so that the inertia forces of said combined unit in each alternate direction of force are transmitted to said compensating means, whereby said combined unit operates in resonance without a specimen but operates below resonance with a specimen thereby to cause the generation and application of the generator force to be maintained constant throughout varying amplitudes of movement of the combined unit.

2. The combination set forth in claim 1 further characterized by the provision of means whereby the force produced by the centrifugal force generator may be varied for different tests while the mass of the generator remains unchanged.

3. The combination set forth in claim 1 further characterized in that the centrifugal force generator comprises a weight and means for adjusting the radius of rotation of said weight thereby to vary the magnitude of alternating force produced while the mass of the generator remains unchanged.

4. The combination set forth in claim 1 further characterized in that the inertia compensating means includes a spring whose spring constant remains fixed at all times.

5. The combination set forth in claim 1 further characterized in that the inertia compensating means includes a two way acting coil spring means connected to the vibratory member to resist inertia forces in each half of a complete vibratory cycle.

6. The combination set forth in claim 1 further characterized in that the inertia compensating means includes a two way acting coil spring means arranged coaxially of and connected to the vibratory member to resist inertia forces in each half of a complete vibratory cycle.

7. The combination set forth in claim 1 further characterized in that the inertia compensating means includes a pair of opposed springs having adjacent ends connected to the vibratory member and whose other ends are held stationary.

8. The combination set forth in claim 1 further characterized by the provision of means for preloading a specimen so that it may have a superimposed load during the fatigue test while still maintaining inertia compensation.

9. The combination set forth in claim 1 further characterized in that the inertia compensating means includes a pair of opposed springs having adjacent ends connected to the vibratory member, means for holding the other ends of said springs stationary, and means for preloading a specimen through said springs.

10. The combination set forth in claim 1 further characterized by the provision of laterally extending elements one end of which is connected to the vibratory member for guiding the same during movement thereof, and means for supporting the other end of said elements by said substantially stationary means to allow said guiding action.

11. The combination set forth in claim 1 further characterizel by the provision of laterally extending rods engaging the vibratory member for guiding the same during movement thereof, said rods being disposed entirely to one side of a diametric line across the axis of the vibratory member, means for supporting one end of said rods, and yieldable means for holding said member in engagement with the other end of the guide rods.

12. The combination set forth in claim 1 further characterized by the provision of at least a pair of substantially parallel laterally extending elements connected to the vibratory member for guiding the same, said elements being disposed in a plane at right angles to the axis of vibration thereby to prevent rotation of said vibratory member about said axis, another element extending from the vibratory member from another side thereof for laterally guiding the same, and means for supporting said elements by the substantially stationary means to allow said guiding action.

13. The combination set forth in claim 1 further characterized by the provision of at least a pair of substantially parallel laterally extending rods engaging the vibratory member for guiding the same, said rods being disposed in a plane at right angles to the axis of vibration thereby to prevent rotation of the vibratory member about said axis, another rod extending from the vibratory member from another side thereof for laterally guiding the same, means for supporting said rods to allow their guiding action, and a spring connected to said vibratory member and disposed between the lateral supporting rod and one of the pairs of rods thereby to hold the vibratory member firmly in contact with all of said guide rods.

14. The combination set forth in claim 1 further characterized by the provision of at least a pair of substantially parallel laterally extending rods engaging the vibratory member for guiding the same, said rods being disposed in a plane at right angles to the axis of vibration thereby to prevent rotation of the vibratory member about said axis, another rod extending from the vibratory member from another side thereof for laterally guiding the same, a spring connected to said vibratory member and disposed between the lateral supporting rod and one of the pair of rods thereby to hold the vibratory member firmly in contact with all of said guide rods, said guide rods and spring being duplicated at another point spaced along the vibratory axis of the vibratory member thereby to stabilize and guide the vibratory member along its entire length, and means for supporting said rods to allow their guiding action.

15. The combination set forth in claim 1 further characterized in that the substantially stationary means comprises a frame, a fixture mounted on said frame for supporting a torsion specimen, and means for subjecting the specimen to alternating torsional force produced by the centrifugal force generator.

16. The combination set forth in claim 1 further characterized in that the substantially stationary means comprises a frame, and a fixture connected to said frame for supporting a specimen so that it may be subjected to an alternating force produced by the centrifugal force generator.

17. A variable amplitude alternating force fatigue testing machine comprising, in combination, a vertically reciprocating vibratory member, a centrifugal force generator journalled in fixed relation to said member for rotation about a horizontal axis which extends laterally from said member, said generator and member thereby forming a combined unit, a stationary motor connected to said generator for rotatably driving the same at a constant speed at all times for producing said alternating force, means for connecting said vibratory member to one point of a specimen by a mechanical connection such that the vibratory member follows movement of the specimen solely in accordance with yielding of the latter, substantially stationary means secured to the specimen at another point thereof so that the specimen can be subjected to the force produced by the centrifugal generator through said mechanical connection, elastic means connected to and disposed intermediate of said vibratory member and said stationary means so that the inertia forces of said combined unit in each alternate direction of force are transmitted to said elastic means, said stationary means being a spring suspended hollow frame having a table-like surface with an opening therethrough, and means for laterally supporting the vibratory member by said frame within the same, said vibratory member having a small table-like portion disposed in said opening in freely spaced relation to the sides thereof, the surfaces of the frame table and vibratory table lying in similar planes to provide conveniently adjacent action and reaction surfaces to which specimen fixtures are removably operatively connected.

BENJAMIN J. LAZAN.

REFERENCES CITED

The following references are of record in the file of this patent:

UNITED STATES PATENTS

| Number | Name | Date |
| --- | --- | --- |
| Re. 22,416 | Eksergian | Jan. 11, 1944 |
| 682,104 | Middleton | Sept. 3, 1901 |
| 1,409,842 | Foster | Mar. 14, 1922 |
| 1,575,519 | Amsler | Mar. 2, 1926 |
| 2,238,116 | Kelly | Apr. 15, 1941 |
| 2,283,743 | Lessig | May 19, 1942 |
| 2,380,622 | Weyandt | July 31, 1945 |

FOREIGN PATENTS

| Number | Country | Date |
| --- | --- | --- |
| 17,309 | Great Britain | 1906 |
| 171,821 | Great Britain | Dec. 1, 1921 |
| 511,118 | Great Britain | Aug. 14, 1939 |